US012681312B2

(12) United States Patent
Rodriguez, II et al.

(10) Patent No.: US 12,681,312 B2
(45) Date of Patent: *Jul. 14, 2026

(54) RING-MOUNTED FLEXIBLE CIRCUIT REMOTE CONTROL

(71) Applicant: Snap Inc., Santa Monica, CA (US)

(72) Inventors: Jonathan M. Rodriguez, II, La Habra, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/227,346

(22) Filed: Jun. 3, 2025

(65) Prior Publication Data

US 2025/0291195 A1 Sep. 18, 2025

Related U.S. Application Data

(60) Continuation of application No. 18/767,836, filed on Jul. 9, 2024, now Pat. No. 12,345,894, which is a continuation of application No. 18/228,284, filed on Jul. 31, 2023, now Pat. No. 12,055,723, which is a division of application No. 17/212,280, filed on Mar. 25, 2021, now Pat. No. 11,762,202.

(60) Provisional application No. 63/057,485, filed on Jul. 28, 2020, provisional application No. 63/003,160, filed on Mar. 31, 2020.

(51) Int. Cl.
*G02B 27/01* (2006.01)
*G06F 3/041* (2006.01)

(52) U.S. Cl.
CPC ..... *G02B 27/0172* (2013.01); *G02B 27/0101* (2013.01); *G06F 3/0416* (2013.01); *G02B 2027/0178* (2013.01)

(58) Field of Classification Search
CPC .............. G06F 3/0416; G02B 27/0101; G02B 27/0172; G02B 27/0178
See application file for complete search history.

(56) References Cited

U.S. PATENT DOCUMENTS

| | | |
|---|---|---|
| 5,454,114 A | 9/1995 | Yach et al. |
| 5,832,296 A | 11/1998 | Wang et al. |

(Continued)

*Primary Examiner* — Ryan A Lubit
(74) *Attorney, Agent, or Firm* — CM Law; Stephen J. Weed

(57) ABSTRACT

Systems, devices, media, and methods are presented for using a flexible electronic device to selectively interact with an eyewear device. A portable eyewear device includes a processor, a memory, and a display projected onto at least one lens assembly. A flexible electronic device includes an integrated circuit, a plurality of input sensors, and a power system, all mounted on a flexible substrate that is sized and shaped to conform to a graspable object such as a ring. The flexible electronic device operates according to a power budget, operating on a sensor power budget until it detects a first interaction with at least one of the input sensors. If the first interaction exceeds a sensitivity threshold, the flexible electronic device sends a wake signal to a nearby eyewear device. In response to the wake signal, the eyewear device presents a graphical user interface (GUI) on the display. The eyewear device further presents a cursor along a path on the display that is substantially correlated to the course traveled by the flexible electronic device in motion along a course.

20 Claims, 14 Drawing Sheets

(56) References Cited

U.S. PATENT DOCUMENTS

| | | | |
|---|---|---|---|
| 9,149,683 B2 * | 10/2015 | Watterson | G08C 19/00 |
| 9,594,427 B2 | 3/2017 | Priyantha et al. | |
| 9,651,992 B2 | 5/2017 | Stotler | |
| 9,696,337 B2 | 7/2017 | Huang et al. | |
| 9,980,024 B2 | 5/2018 | Hosoi et al. | |
| 10,037,052 B2 | 7/2018 | Stotler | |
| 10,444,834 B2 | 10/2019 | Vescovi et al. | |
| 10,514,797 B2 | 12/2019 | Kugler et al. | |
| 11,762,202 B1 * | 9/2023 | Rodriguez, II | G06F 3/0416 |
| | | | 345/8 |
| 12,055,723 B2 * | 8/2024 | Rodriguez, II | G02B 27/0172 |
| 12,345,894 B2 * | 7/2025 | Rodriguez, II | G02B 27/0101 |
| 2011/0070829 A1 | 3/2011 | Griffin et al. | |
| 2014/0125785 A1 * | 5/2014 | Na | H04N 13/341 |
| | | | 348/56 |
| 2015/0048979 A1 | 2/2015 | Asrani et al. | |
| 2015/0277559 A1 | 10/2015 | Vescovi et al. | |
| 2015/0338916 A1 | 11/2015 | Priyantha et al. | |
| 2016/0195999 A1 * | 7/2016 | Reynolds | G06F 3/03547 |
| | | | 345/174 |
| 2016/0291768 A1 * | 10/2016 | Cho | G06F 3/017 |
| 2016/0292563 A1 | 10/2016 | Park | |
| 2019/0391612 A1 | 12/2019 | Stotler | |
| 2020/0253813 A1 | 8/2020 | Kuhns | |
| 2020/0371349 A1 * | 11/2020 | Katz | G02B 27/0101 |
| 2021/0056333 A1 * | 2/2021 | Cheng | G06V 40/1318 |
| 2021/0240246 A1 * | 8/2021 | Tham | G01P 13/02 |

* cited by examiner

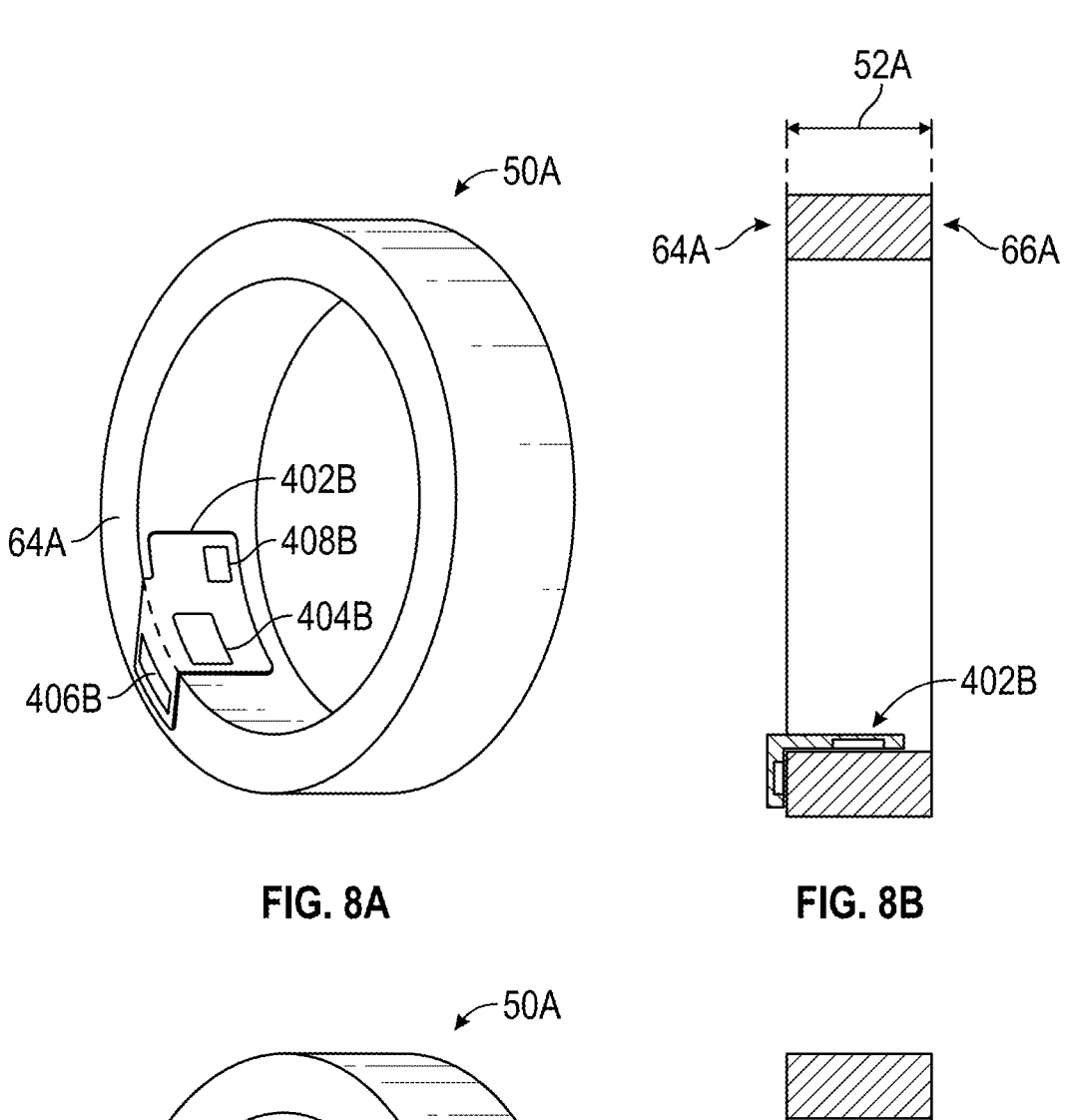
FIG. 8A
FIG. 8B
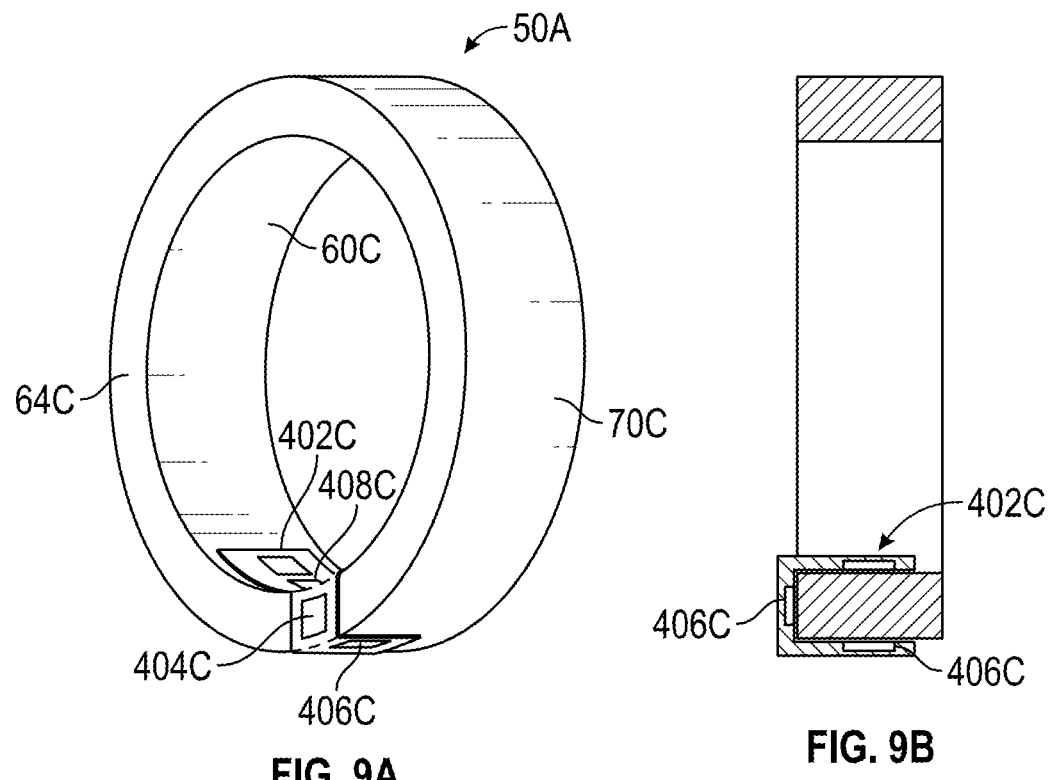
FIG. 9A
FIG. 9B

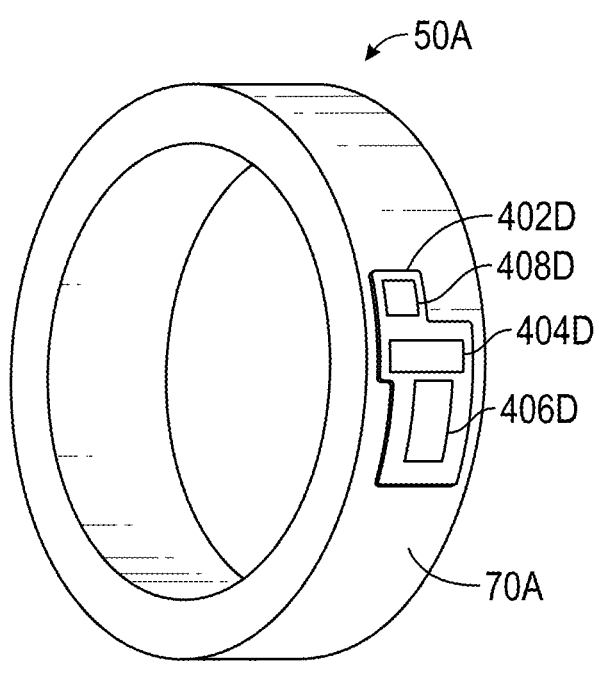
FIG. 10
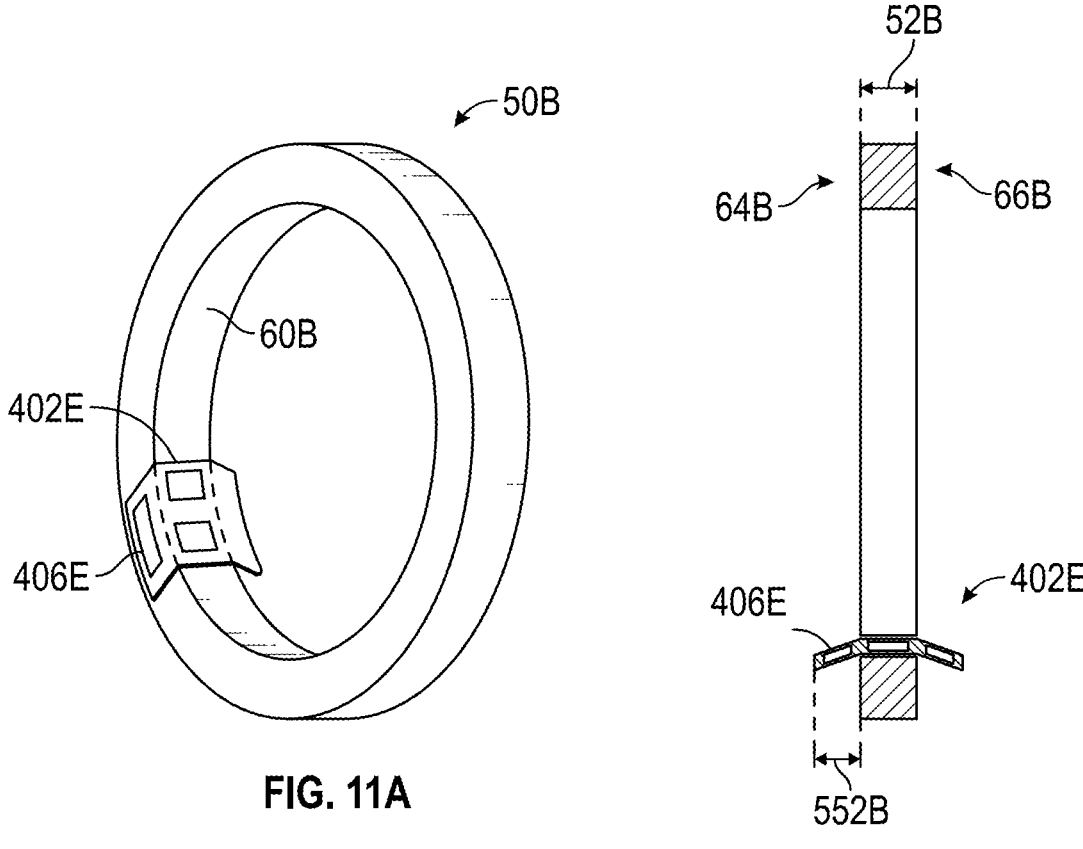
FIG. 11A
FIG. 11B

RING-MOUNTED FLEXIBLE CIRCUIT REMOTE CONTROL

CROSS-REFERENCE TO RELATED APPLICATIONS

This application is a Continuation of U.S. application Ser. No. 18/767,836 filed on Jul. 9, 2024, which is a Continuation of U.S. application Ser. No. 18/228,284 filed on Jul. 31, 2023, now U.S. Pat. No. 12,055,723, which is a Divisional of U.S. application Ser. No. 17/212,280 filed on Mar. 25, 2021, now U.S. Pat. No. 11,762,202, which claims priority to U.S. Provisional Application Ser. No. 63/003,160 filed Mar. 31, 2020, and U.S. Provisional Application Ser. No. 63/057,485 filed Jul. 28, 2020, the contents of all of which are incorporated fully herein by reference.

TECHNICAL FIELD

Examples set forth in the present disclosure relate to portable electronic devices, including flexible electronics, handheld devices, and wearable devices such as eyewear. More particularly, but not by way of limitation, the present disclosure describes a flexible electronic device attached to a graspable object such as a ring and configured to selectively interact with an eyewear device.

BACKGROUND

Many types of computers and electronic devices available today, such as mobile devices (e.g., smartphones, tablets, and laptops), handheld devices (e.g., smart rings, special-purpose accessories), and wearable devices (e.g., smartglasses, digital eyewear, headwear, headgear, and head-mounted displays), include a variety of sensors, wireless transceivers, input systems (e.g., touch-sensitive surfaces, pointers), peripheral devices, displays, and graphical user interfaces (GUIs) through which a user can interact with displayed content.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 8A is a perspective illustration of an example hardware configuration for a flexible electronic device attached to a ring and suitable for use with the flexible circuit and control system of FIG. 4;

FIG. 8B is a cross-sectional illustration of the example hardware configuration for a flexible electronic device of FIG. 8A;

FIG. 9A is a perspective illustration of an example hardware configuration for a flexible electronic device attached to a ring and suitable for use with the flexible circuit and control system of FIG. 4;

FIG. 9B is a cross-sectional illustration of the example hardware configuration for a flexible electronic device of FIG. 9A;

FIG. 10 is a perspective illustration of an example hardware configuration for a flexible electronic device attached to a ring and suitable for use with the flexible circuit and control system of FIG. 4;

FIG. 11A is a perspective illustration of an example hardware configuration for a flexible electronic device attached to a narrow-band ring and suitable for use with the flexible circuit and control system of FIG. 4;

FIG. 11B is a cross-sectional illustration of the example hardware configuration for a flexible electronic device of FIG. 11A.

DETAILED DESCRIPTION

Figure 1A:
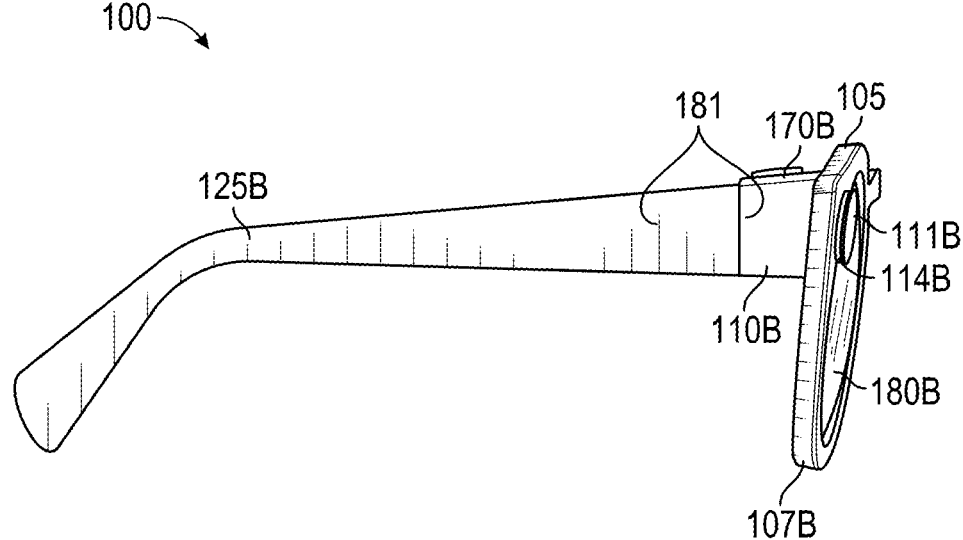
FIG. 1A is a side view (right) of an example hardware configuration of an eyewear device suitable for use in a flexible circuit and control system.

Various implementations and details are described with reference to an example: a flexible circuit and control system for selectively interacting with an eyewear device. The eyewear device includes a processor, a memory, and a display presented on at least one lens assembly. A flexible electronic device includes an integrated circuit, a plurality of input sensors, and a power system, all mounted on a flexible substrate that is sized and shaped to conform to a graspable object such as a ring. The flexible electronic device operates according to a power budget, operating on a relatively-low sensor power budget until it detects a first interaction with at least one of the input sensors. If the first interaction exceeds a sensitivity threshold, the flexible electronic device sends a wake signal to a nearby eyewear device. In response to the wake signal, the eyewear device presents a graphical user interface (GUI) on the display. In addition to the flexible circuit and control system, the systems and methods described herein may be applied to and used with any of a variety of systems, such as those in which a user desires to use two or more electronic devices to access and control a graphical user interface (GUI).

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear 100 may include a touchpad on the left side.

The surface of the touchpad 181 is configured to detect finger touches, taps, and gestures (e.g., moving touches) for use with a GUI displayed by the eyewear, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
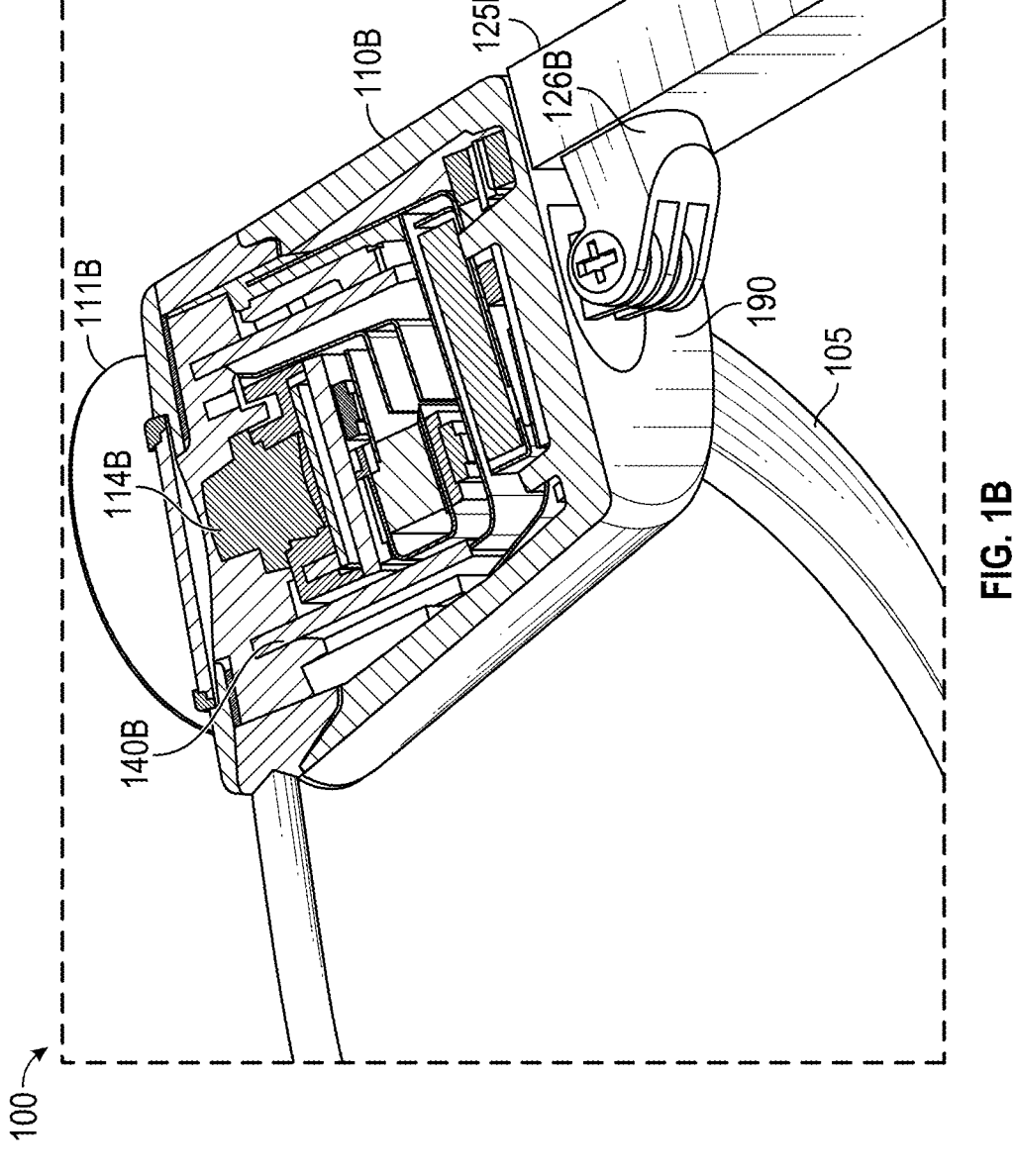
FIG. 1B is a top, partly sectional view of a right corner of the eyewear device of FIG. 1A depicting a right visible-light camera, and a circuit board.
Figure 1C:
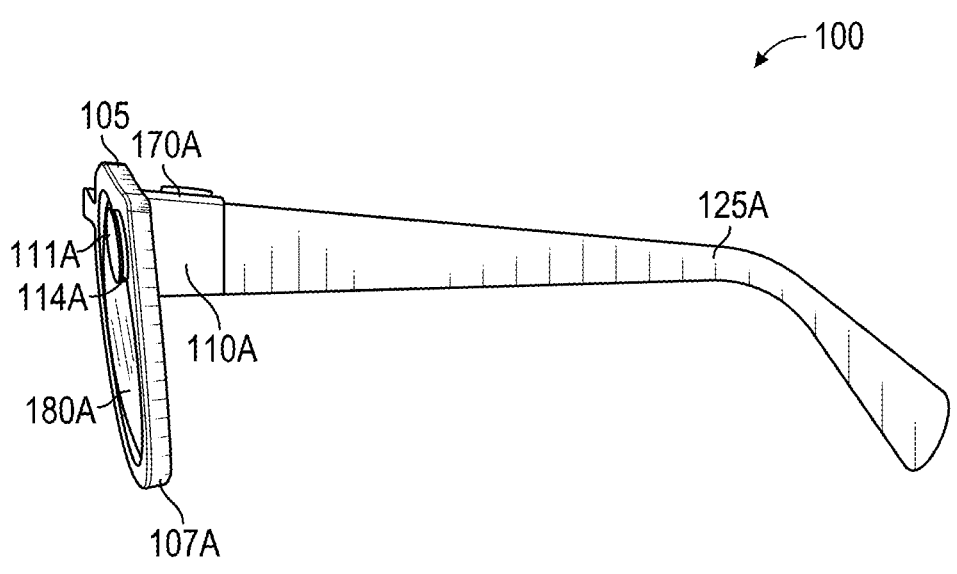
FIG. 1C is a side view (left) of an example hardware configuration of the eyewear device of FIG. 1A, which shows a left visible-light camera.
Figure 1D:
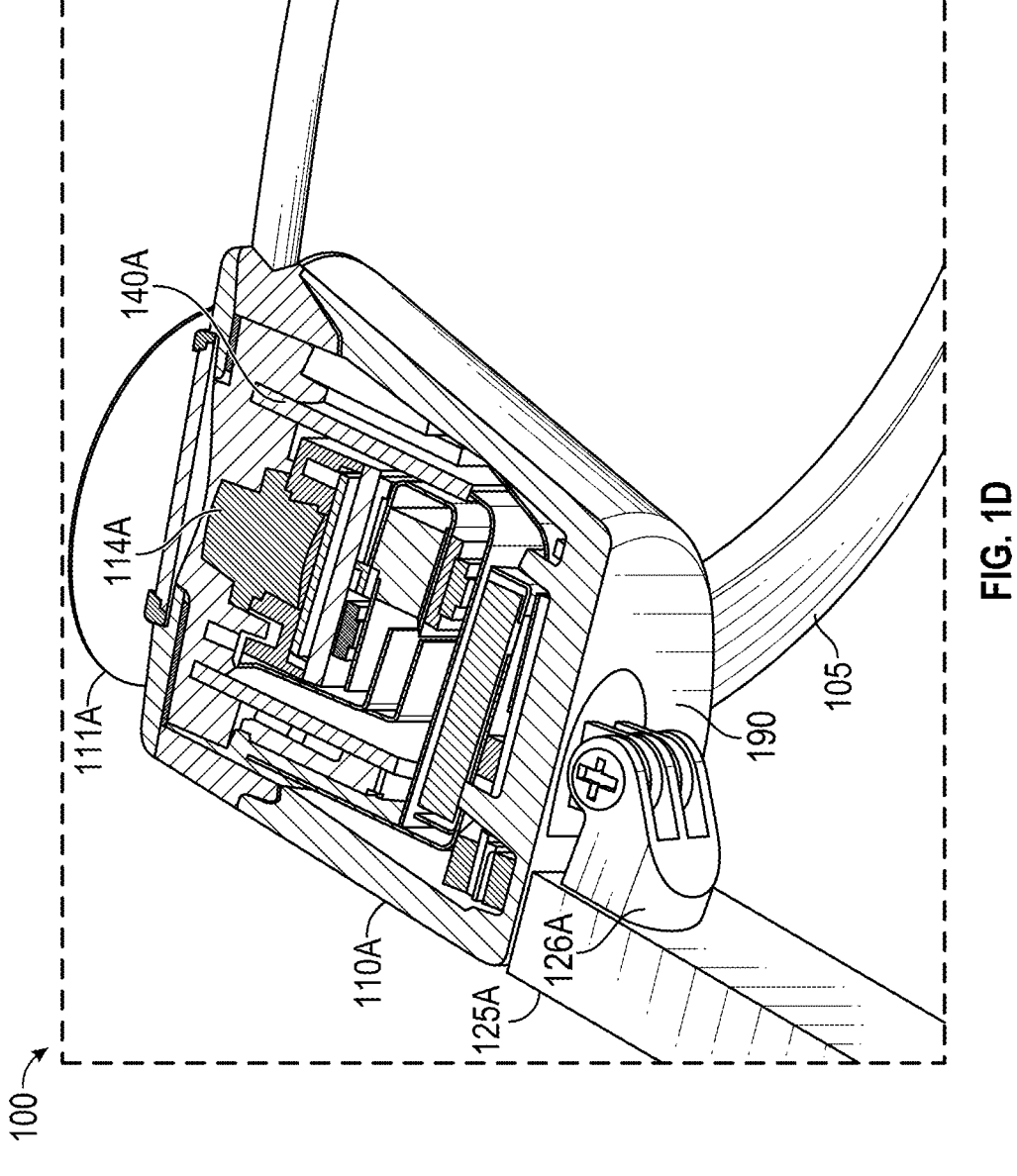
FIG. 1D is a top, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
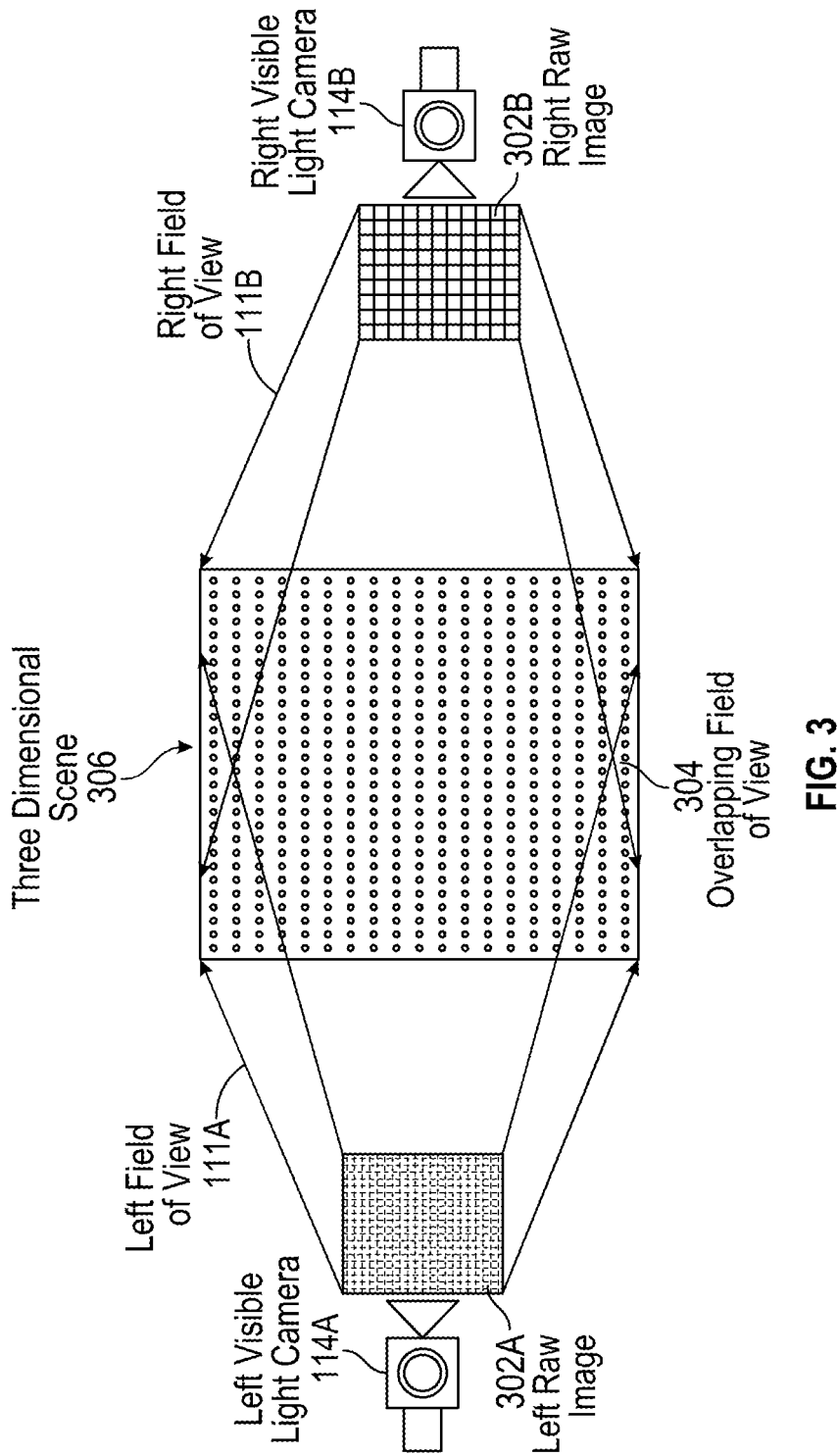
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geo-location data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections create an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the flexible circuit and control system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
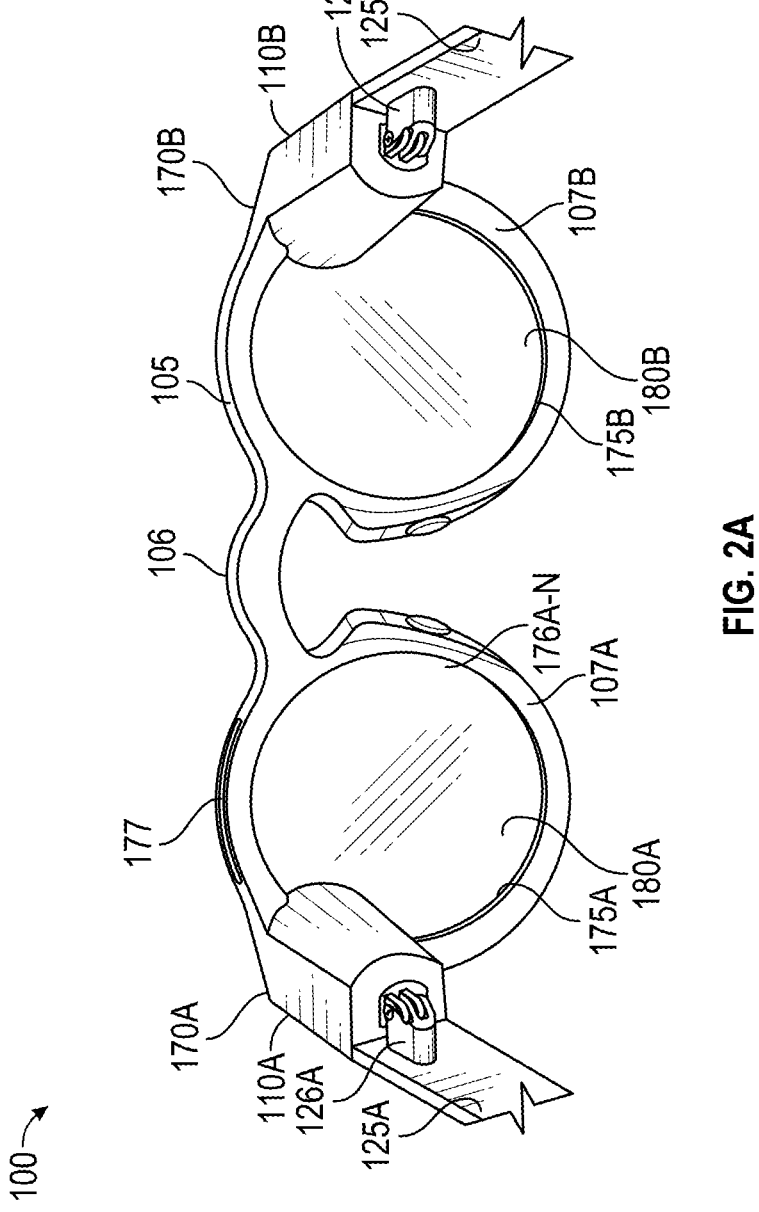
FIGS. 2A and 2B are rear views of example hardware configurations of an eyewear device utilized in the flexible circuit and control system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
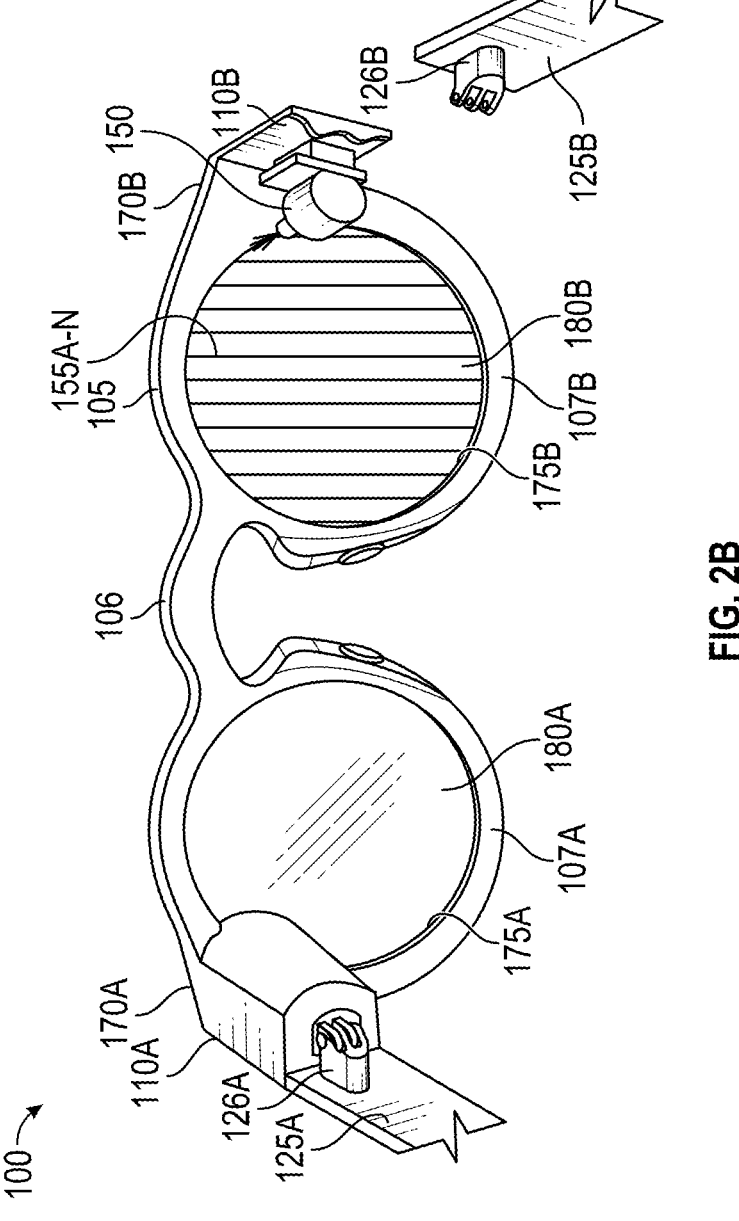

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to create an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
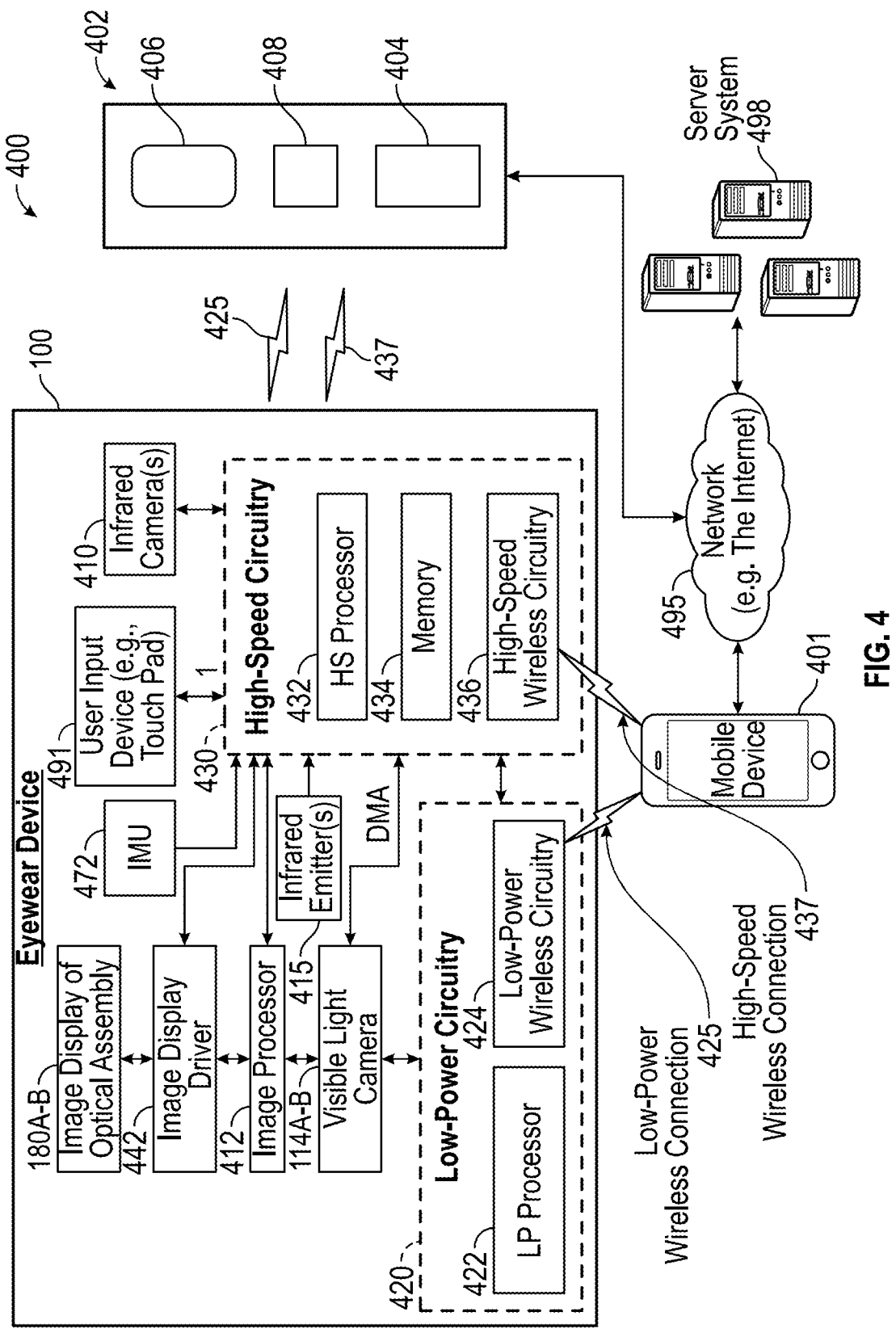
FIG. 4 is a functional block diagram of an example flexible circuit and control system including a wearable device (e.g., an eyewear device), a flexible electronic device (suitable for attachment to a graspable object, such as a ring), and a server system connected via various networks.

FIG. 4 is a functional block diagram of an example flexible circuit and control system 400 including a wearable device (e.g., an eyewear device 100), a flexible electronic device 402, a mobile device 401, and a server system 498 connected via various networks 495 such as the Internet. The system 400 includes a low-power wireless connection 425 and a high-speed wireless connection 437 between the eyewear device 100 and a mobile device 401—and, in some implementations, as shown, between the eyewear device 100 and the flexible electronic device 402.

The flexible electronic device 402 in some implementations includes a flexible printed circuit (FPC) supported by a flexible substrate. Flexible electronics may be manufactured using identical or similar components to those used on rigid printed circuit boards (PCB).

The flexible electronic device 402 in some implementations includes an integrated circuit 404, coupled to one or more input sensors 406, both of which are coupled to a power system 408. The circuit 404, sensors 406, and power system 408 may be any size and shape, arranged in any of a variety of configurations. The flexible electronic device 402 may be any size and shape, depending on the desired use, such as the generally rectangular example illustrated in FIG. 4.

The flexible electronic device 402 in some implementations is waterproof or water-resistant, e.g., when sized and shaped for attachment to a graspable object such as a ring that will be exposed to ambient precipitation, perspiration, and water such as during hand washing. The flexible electronic device 402 in some implementations may be encapsulated in a water-resistant container, which may include one or more separate compartments. Different compartments may be constructed with different degrees of water resistance. A compartment with relatively low water resistance may include one or more drains, channels, or other structures to facilitate the motion of water away from the device using gravity, capillary action, or other forces. The input sensors 406 may be clustered together in an array of cooperating elements, e.g., in the same water-resistant compartment, or relatively isolated in separate compartments.

Figure 7A:
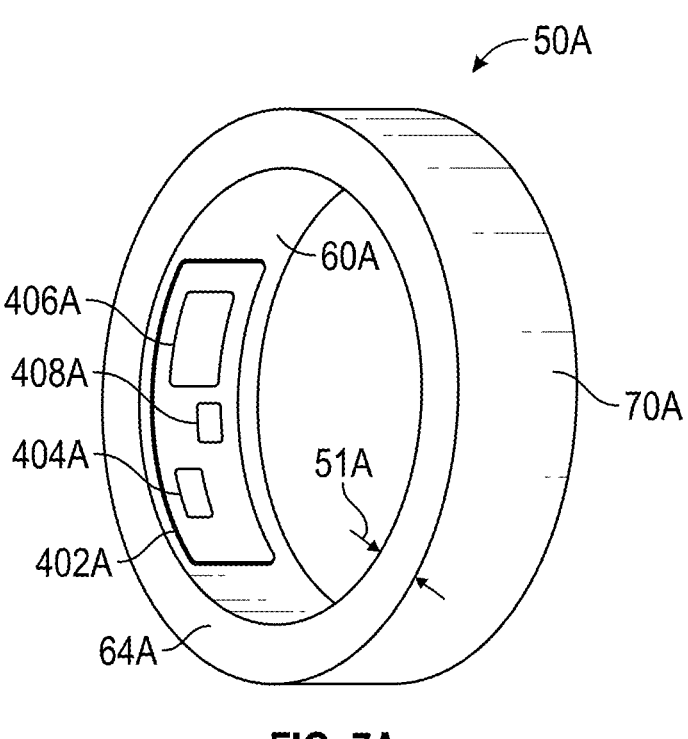
FIG. 7A is a perspective illustration of an example hardware configuration for a flexible electronic device attached to a wide-band ring and suitable for use with the flexible circuit and control system of FIG. 4.

The flexible electronic device 402 itself, in some implementations, is sized and shaped to be easily grasped by a hand. In some implementations, the flexible electronic device 402 is sized and shaped for attachment to a graspable object, such as a ring 50A (as shown in FIG. 7A), with a permanent adhesive (e.g., a UV-cured compound or epoxy) or a temporary, selectively releasable adhesive. In this aspect, the flexible electronic device 402 when attached converts an ordinary ring into a smart ring.

As shown in FIG. 4, the eyewear device 100 includes one or more visible-light cameras 114A, 114B that capture still images or video, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images or video. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or WiFi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
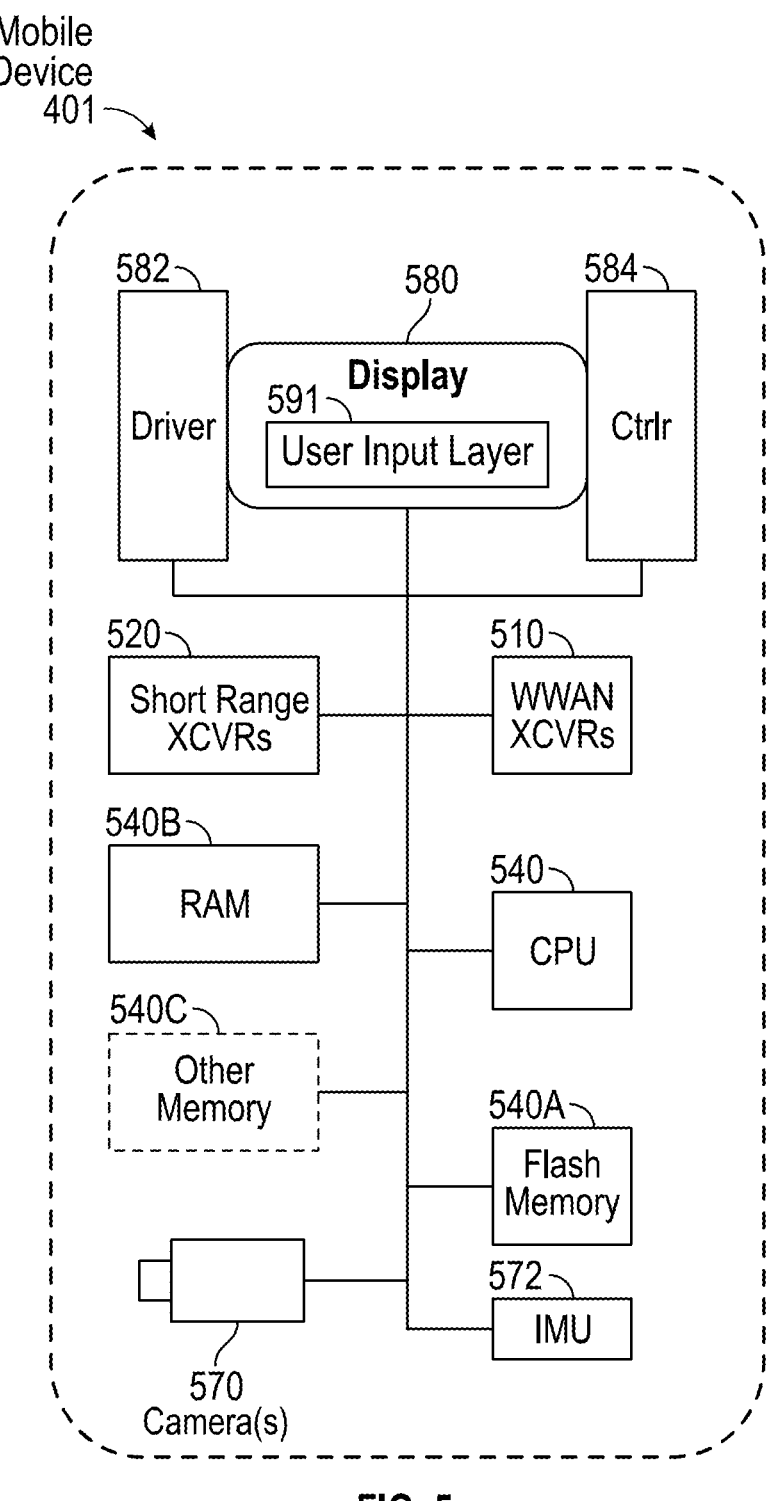
FIG. 5 is a diagrammatic representation of an example hardware configuration for a mobile device of the flexible circuit and control system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force, or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

In some implementations, the devices 100, 401, 402 illustrated in FIG. 4 are configured to cooperate and share the processing demand when performing any of the functions described herein. For example, the flexible electronic device 402 may be configured to detect an interaction, such as a finger tap, and process the interaction to determine if the tap exceeds a sensitivity threshold. If so, the flexible electronic device 402 in some implementations sends a wake signal to the eyewear device 100, at which point the eyewear device 100 takes over the task of performing additional functions. Additional functions may be performed by the mobile device 401. In this aspect, the flexible circuit and control system 400 distributes, shares, and manages the processing demand such that the functions described herein are performed efficiently and effectively.

Figure 6:
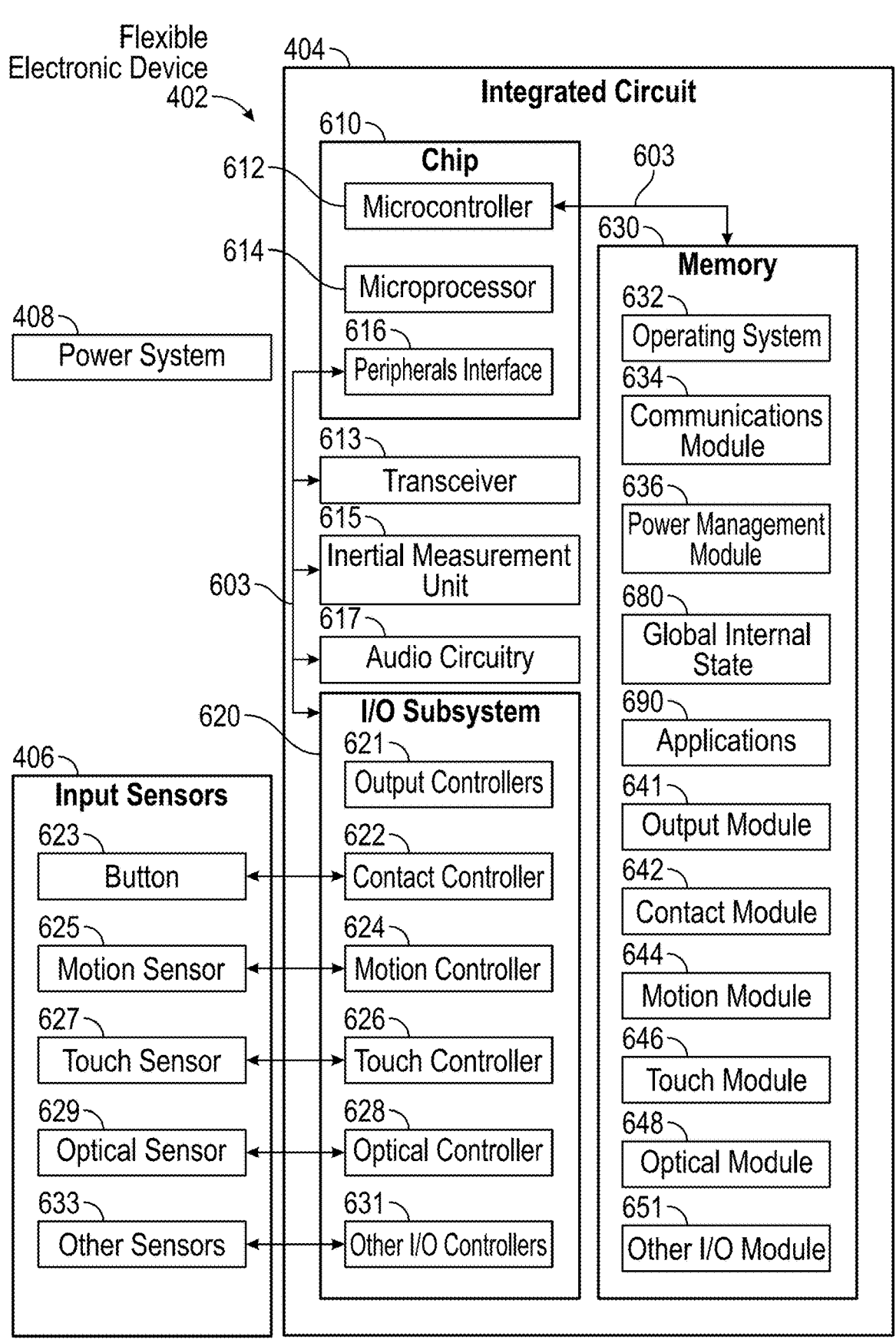
FIG. 6 is a diagrammatic representation of an example hardware configuration for a flexible electronic device of the flexible circuit and control system of FIG. 4.

The flexible circuit and control system 400, as shown in FIG. 4, includes a computing device, such as mobile device 401, coupled to an eyewear device 100 and a flexible electronic device 402 over a network. The flexible circuit and control system 400 includes a memory for storing instructions and a processor for executing the instructions. Execution of the instructions of the flexible circuit and control system 400 by the processor 432 configures the eyewear device 100 to cooperate with the flexible electronic device 402 or the mobile device 401. The system 400 may utilize the memory 434 of the eyewear device 100 or the memory elements 540A, 540B, 540C of the mobile device 401 (FIG. 5) or the memory 630 of the flexible electronic device 402 (FIG. 6). Also, the system 400 may utilize the processor elements 432, 422 of the eyewear device 100 or the central processing unit (CPU) 530 of the mobile device

401 (FIG. 5) or the microprocessor 614 of the flexible electronic device 402 (FIG. 6). In addition, the system 400 may further utilize the memory and processor elements of the server system 498. In this aspect, the memory and processing functions of the flexible circuit and control system 400 can be shared or distributed across the eyewear device 100, the mobile device 401, the flexible electronic device 402, or the server system 498.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a controller 584. In the example of FIG. 4, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 401 with a user interface that includes a touchscreen input layer 591 for receiving input (by touch, multi-touch, or gesture, and the like, by hand, stylus or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or WiFi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

FIG. 6 is a high-level functional block diagram of an example flexible electronic device 402. The flexible electronic device 402, as shown, includes an integrated circuit 404 coupled to a plurality of input sensors 406, all of which is coupled to a power system 408.

The integrated circuit 404 in some implementations includes an integrated circuit (IC) chip 610 (or more than one chip) and a memory 630 connected by a bus 603. The chip 610 in some implementations includes a microcontroller 612, a microprocessor 614, and a peripherals interface 616 connected by a bus 603 to a transceiver 613, an inertial measurement unit 615, audio circuitry 617, and an input-output (I/O) subsystem 620.

The microprocessor 614 functions as a central processing unit for the flexible electronic device 402 and serves as a programmable host controller by configuring the flexible electronic device 402 to perform various operations, for example, in accordance with instructions or programming stored in the memory 630. Such operations may include various general operations of the flexible electronic device 402 as well as operations related to the programming for applications stored in memory 630.

The memory 630 in some implementations includes random-access memory (RAM) element for storing and processing short-term instructions and data, along with a non-volatile flash memory for storing programming or instructions for execution by the microprocessor 614. Access to the memory 630 by other components of the flexible electronic device 402 may be controlled by the microcontroller 612. The elements stored in the memory 630 in some implementations includes an operating system 632, a communications module 634, a power management module 636, a global internal state 680, one or more programs or applications 690, an output module 641, a contact module 642, a motion module 644, a touch module 646, an optical module 648, and other input-output module 651. The global internal state 680 includes information about the current status of various components on the flexible electronic device 402 and a record or database of such states at specific times. The global internal state 680 in some implementations includes a power state (including information about the current power level), an active application state (indicating which applications 690 are currently active), a sensor state (including information obtained from the input sensors 406), and a location state (including information about the location, position, attitude, or motion of the flexible electronic device 402).

The transceiver 613 in some implementations includes at least one short-range transceiver, digital or analog, configured for short-range network communications and may include a longer-range transceiver configured for communications in a wireless wide-area network (WWAN) as described herein. Additionally, the transceiver 613 may include a global positioning system (GPS) receiver to generate location coordinates associated with the flexible electronic device 402. The transceiver 613 in some implementations uses a standard protocol such as NFC, VLC, DECT, ZigBee, Bluetooth, Bluetooth Low-Energy (BLE), or WiFi. For example, the transceiver 613 may take the form of any available two-way wireless local area network (WLAN) transceiver of a type that is compatible with one or more standard protocols of communication implemented in wireless local area networks, such as one of the Wi-Fi standards under IEEE 802.11. Alternatively, transceiver 613 in some implementations uses a non-standard RF protocol that typically consumes less power while providing a faster response.

The transceiver 613 in some implementations includes RF circuitry and an antenna system to facilitate wireless communication. The antenna may include a single-loop multifeed (SLM) antenna system or similar arrangement. The ring itself in some implementations functions as an omnidirectional loop antenna; however, not all rings are metallic (or good conductors). The antenna in some implementations may include a miniature ceramic chip antenna, an antenna on a chip, an array of conductors printed in a pattern on an outward-facing surface of the flexible electronic device 402, or other miniature elements to create an antenna or antenna-like system.

The inertial measurement unit 615 of the flexible electronic device 402 includes a collection of motion-sensing components, one or more of which are micro-electro-mechanical systems (MEMS) with microscopic moving parts that are small enough to be part of a microchip. The inertial measurement unit (IMU) 615 in some implementations includes an accelerometer, a gyroscope, and a magnetometer. The accelerometer senses the linear acceleration of the flexible electronic device 402 (including the acceleration due to gravity) relative to three orthogonal axes (x, y, z). The gyroscope senses the angular velocity of the flexible electronic device 402 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the flexible electronic device 402 relative to magnetic north. The IMU 615 in some implementations includes or cooperates with a digital motion processor or programming that gathers the raw data from the IMU components and computes a number of useful values about the position, orientation, and motion of the flexible electronic device 402. For example, the acceleration data gathered from the accelerometer can be integrated, mathematically, to obtain a velocity relative to each axis (x, y, z); and integrated again to obtain a position of the flexible electronic device 402 (in linear coordinates, x, y, and z). The angular velocity data from the gyroscope can be integrated to obtain the position of the flexible electronic device 402 (in spherical coordinates). The programming or instructions for computing these useful values may be stored in memory 630 and executed by the microprocessor 614 on the chip 610.

The audio circuitry 617 in some implementations includes a microphone and a loudspeaker and thereby provides an audio interface with a user. In this aspect, the flexible electronic device 402 is configured to receive and process voice commands and other sounds through a microphone. The audio circuitry 617 converts the electrical signal from the microphone and sends the audio data to the peripherals interface 616 for processing; for example, to retrieve data or start one of the applications 690. The audio circuitry 617 in some implementations retrieves audio data from applications or modules in the memory 630 and transmits the audio data in a human-audible format to a loudspeaker. In this aspect, the flexible electronic device 402 may be configured to play a sound, recite text, or engage in dialogue with the user.

The I/O subsystem 620 couples the input sensors 406 with the peripherals interface 616 on the chip 610 using a number of discrete controllers. The I/O subsystem 620 in some implementations includes a plurality of input controllers designed to detect and process inputs (e.g., electrical signals or data from (or to) the input sensors 406) and one or more output controllers 621 configured to process and send (or receive) outputs from any of a variety of output systems, such as a loudspeaker or haptic feedback generator.

The I/O subsystem 620 in some implementations includes a contact controller 622 coupled to one or more contact-sensitive mechanical sensors (e.g., button 623), a motion controller 624 coupled to a motion sensor 625, a touch controller 626 coupled to a touch sensor 627, an optical controller 628 coupled to an optical sensor 629, and one or more other input-output controllers 621 coupled to one or more other input sensors 633 (including, for example, one or more proximity sensors, environmental sensors, or biometric sensors as described herein).

The flexible electronic device 402 in some implementations includes one or more contact-sensitive mechanical sensors, such as button 623, coupled to a contact controller 622 and operated according to instructions in a contact module 622. The button 623 may be mechanical in nature and include a depressible component that makes contact with a conductive element in response to a physical pressing force by a user, along with a spring or other biasing element to return the component to a default position. The button 623 may be located adjacent any surface on a ring 50 in any orientation likely to respond to a pressing force on the button 623 itself or on the ring 50. For example, a button 623 may be located on the inner surface of a ring 50 where a physical force applied to the outer surface of the ring 50 will cause the button to depress. The button 623 instead may be electrically operated by sensing touch or proximity (e.g., through a change in capacitance caused when a user's finger or thumb touches or nears the button 623). The button 623 may optionally or additionally include one or more force sensors, piezoresistive strain gauges, or other intensity sensor components that detect and measure the force of contact.

The flexible electronic device 402 in some implementations includes one or more motion sensors 625 coupled to a motion controller 624 and operated according to instructions in a motion module 444. The motion sensor 625 in some implementations detects the motion, velocity, or acceleration of the flexible electronic device 402 as detected, measured, and conveyed by the inertial measurement unit (IMU) 615. The motion sensor 625 in some implementations may include a passive infrared detector, an ultrasonic transducer and detector, one or more cameras or photodetectors configured to detect bodily motion (e.g., gait, facial expressions, hand gestures, and finger points).

The flexible electronic device 402 in some implementations includes one or more touch sensors 627 coupled to a touch controller 626 and operated according to instructions in a touch module 646. A touch sensor 627 may include one or more touch-sensitive surfaces or touchpads located near an external surface of the flexible electronic device 402 that is generally accessible to touch inputs. When the flexible electronic device 402 is attached to a ring 50A, for example, a touch sensor 627 may be part of the input sensors 406B positioned along an edge 64A of the ring 50A as shown in FIG. 8A and FIG. 8B. The surface of the touch sensor 627 is configured to detect touches by a finger, stylus, or other tool, taps (single or multiple), swipes or slides (i.e., moving touches), multi-finger touches (e.g., two fingers spreading or pinching), and other such gestures and interactions. The touch sensor 627 in some implementations cooperates with the IMU 615 (especially the accelerometer) to detect the acceleration generated by taps.

The flexible electronic device 402 in some implementations includes one or more optical sensors 629 coupled to an optical controller 628 and operated according to instructions in an optical module 648. An optical sensor 629 in some implementations includes a digital image sensor, such as a charge-coupled device (CCD) or a CMOS sensor, that converts the variable attenuation of light into electronic signals. When the flexible electronic device 402 is attached to a ring 50A, for example, an optical sensor 629 in some implementations may be located to detect a difference in light between an open hand and a closed fist. An optical sensor 629 in some implementations may include a light source configured to direct a collimated light through an aperture and an associated light sensor to detect the light reflected back through the aperture. The aperture, for example, may be positioned on an outward-facing surface of a ring in a location where it may be covered by a thumb or finger.

The flexible electronic device 402 in some implementations includes one or more other sensors 633 coupled to one or more other input-output controllers 631 and operated according to instructions in one or more other input-output modules 651. One kind of other sensor 633 in some implementations includes a proximity sensor using a magnet inside the flexible electronic device 402. When the flexible electronic device 402 is attached to a ring 50A, for example, the proximity sensor may be activated when the ring 50A is placed within a predetermined proximity of another device, such as mobile phone or a smart watch.

The flexible circuit and control system 400 in some implementations includes an eyewear device 100 and a flexible electronic device 402 having an integrated circuit 404 coupled to one or more input sensors 406, both of which are coupled to a power system 408. The flexible electronic device 402 is configured in some implementations to operate according to a power budget, which includes a sensing power budget (for operating in a sensing mode) and a full-power budget (for operating in a normal mode). The flexible electronic device 402 in some implementations operates in sensing mode most of the time, drawing relatively low power from the power system 408 according to the sensing power budget, in order to conserve energy and avoid overheating. In sensing mode, the sensing power budget is a range of currents and voltages sufficient to power one or more of the input sensors 406 (along with related components necessary to detect, evaluate, and process data collected by the one or more input sensors 406). The flexible electronic device 402 in sensing mode is configured to detect a first interaction (associated with a first sensor) and to determine if that first interaction exceeds a first sensitivity threshold. If so, the flexible electronic device 402 switches to normal mode (drawing power according to the full-power budget) and sends a wake signal to the eyewear device 100. Otherwise, if the threshold is not exceeded, the flexible electronic device 402 remains in sensing mode.

One or more input sensors 406 may be optimized to operate using extremely low power when the system 400 is in sensing mode. For example, the sensing power budget may be sufficient to power a capacitance-based button that requires only about 80 uA (eighty microamperes, or eighty-millionths of one ampere), an infrared motion sensor that requires between about 1.0 and 1.9 uA, and/or a MEMS accelerometer that requires about 1.0 uA or less. An optical sensor may be configured to operate with 10 uA in a low-power mode (powered according to the sensing power budget), and only 20 mA (twenty milliamps) in a normal mode (powered according to the full-power budget). In this aspect, the power system 408 may be configured with a sensing power budget that is between about 1.0 and about 10 uA (microamperes), depending on which of the one or more input sensors 406 is selected to be active during sensing mode. In a related aspect, the operational modes for various sensors may include a power component and a time component. For example, a capacitance-based button in low-power mode is characterized by a power component (e.g., 80 uA) and a time component (e.g., scanning for changes in capacitance every 195 milliseconds). In normal mode, for example, such a button may require 175 uA and scan every 30 milliseconds.

The first sensitivity threshold in some implementations may be set relatively high, in order to minimize 'false positives' based on unintended inputs or activation, and also to conserve power before switching to normal mode. For example, a relatively high first sensitivity threshold may require a significant input such as an affirmative button push, an intended motion or touch, or an intentional interaction with an optical sensor. An accelerometer-based sensor, for example, may operate in sensing mode using a first sensitivity threshold of 8 g (eight times the acceleration due to gravity), whereas it operates in normal mode using a subsequent sensitivity threshold of only 2 g. An optical sensor may be configured in sensing mode to operate with a first sensitivity threshold of 75,000 lux (i.e., registered an input or interaction only when sensing a change in luminous flux of at least 75,000 lumens per square meter), whereas it operates in normal mode using a subsequent sensitivity threshold of only 10,000 lux. The sensitivity threshold for each sensor type will vary depending on the type of input being measured. In a related aspect, the sensitivity thresholds may include an intensity value and a time value. For example, the sensitivity thresholds for an optical sensor may be characterized by an intensity value (e.g., in lux or in multiples of g) and a time value (e.g., in milliseconds). The time value may represent how often a sensor is configured to scan for inputs (e.g., changes in luminous flux) or the time value may include a time period during which the sensor counts a number of occurrences (e.g., the number of 'dark values' sensed by an optical sensor during a 450-millisecond time window).

In normal mode, in some implementations, all or most of the flexible electronic device 402 is powered according to a full-power budget, such that all or most of the systems and applications 690 are active and powered. The normal mode is time-limited in some implementations by using a timer with a programmable time-out interval. If no additional inputs or interactions are detected, and no command signal arrives from the eyewear device 100, the flexible electronic device 402 will return to sensing mode when the time-out interval has elapsed.

To further minimize false positives based on unintended inputs, the flexible electronic device 402 may be configured to operate two or more input sensors 406 while in sensing mode. In this aspect, at least two discrete and intentional inputs are required from the user in order for the first interaction to exceed the first sensitivity threshold. For example, the flexible electronic device 402 may be configured in sensing mode, drawing power according to a sensing power budget, to power a touch sensor 627 and a motion sensor 625. To generate a first interaction sufficient to exceed the threshold, the user must double-tap the touch sensor 627 and rotate the flexible electronic device 402 about a vertical axis to also activate the motion sensor 625 (via the IMU 615). Any of a variety of combinations of input sensors 406 and physical actions may be required, in sets of two or more, for the user to activate the flexible electronic device 402 into normal mode and send a wake signal to the eyewear device 100.

When the flexible electronic device 402 sends the wake signal to the eyewear device 100, the eyewear device 100 is configured to present a first graphical user interface on a display 180A/180B associated with the eyewear device 100. The eyewear device 100 in some implementations is configured to detect a subsequent interaction associated with the first sensor (or with one or more second input sensors 406 on the flexible electronic device 402). The subsequent sensitivity threshold in normal mode, in some implementations, is generally lower than the first sensitivity threshold because the flexible electronic device 402 is active, by itself or together with an eyewear device 100 or another mobile device, and ready to receive additional inputs. If the subsequent interaction exceeds the subsequent sensitivity threshold, then the eyewear device 100 in some implementations is configured to present a subsequent graphical user interface on a display 180A/180B associated with the eyewear device 100.

The subsequent graphical user interface, in some implementations, includes a cursor presented on a display associated with the eyewear device 100. The eyewear device 100 is configured to display a cursor at a first location along a path. The flexible electronic device 402 in some implementations collects motion data associated with a course traveled by a hand in motion that is holding the flexible electronic device 402. Based on the motion data associated with the course, the eyewear device 100 displays the cursor at a second location. The path of the cursor on the display is substantially correlated to the course traveled by the flexible electronic device 402 (in the air) in near real-time, such that the cursor moves in close synchronization with the motion of the flexible electronic device 402. The cursor in some implementations may be used to select or otherwise interact with other elements of the subsequent GUI presented on the display.

The sensing mode and normal mode are controlled and managed by the power system 408 either alone or in cooperation with the power management module 636 saved in memory 630 on the flexible electronic device 402. The power system 408 in some implementations includes two separate systems: a low-power system for delivering power according to a sensing power budget when the device 402 is operating in sensing mode, and a full-power system for delivering power according to a full-power budget when the device 402 is operating in normal mode, each with its own power source or battery and recharging assembly.

The power system 408 in some implementations includes one or more power sources, a recharging assembly, and a power management system (e.g., stored and operated according to the power management module 636). The power sources may include one or more miniature, rechargeable battery cells.

The recharging assembly in some implementations includes one or more charging pins located on the flexible electronic device 402 in a position accessible to a compatible power supply cord. In some implementations, the recharging assembly includes a wireless induction-based recharging system in which the power source recharges when placed on or near a recharging base unit. The recharging assembly may include one or more lights or other indicators to provide information about battery or the status of the recharging process.

The recharging assembly in some implementations includes an energy harvesting system to gather power from the motion of the device 402 (kinetic energy) or from one or more external sources such as solar energy. The energy harvestings components may include micro-electro-mechanical systems (MEMS) with microscopic moving parts that are highly responsive to relatively small inputs and configured to generate small but consistent amounts of power.

FIG. 7A is a perspective illustration of an example hardware configuration for a flexible electronic device 402A attached to a wide-band ring 50A. The ring 50A is sized and shaped for wear on a finger or thumb. The ring 50A has a radial thickness 51A extending between a generally cylindrical inner surface 60A and an opposing outer surface 70A. The ring 50A has a lateral width 52A as shown in FIG. 8B. The flexible electronic device 402A is sized and shaped to flexibly conform to the inner surface 60A without significant overlap. The flexible electronic device 402A may be sized in thickness to inhibit irritation of the finger or thumb while also facilitating awareness of the device for the wearer of the ring 50A. The flexible electronic device 402A includes an integrated circuit 404A, coupled to one or more input sensors 406A, both of which are coupled to a power system 408A.

Figure 7B:
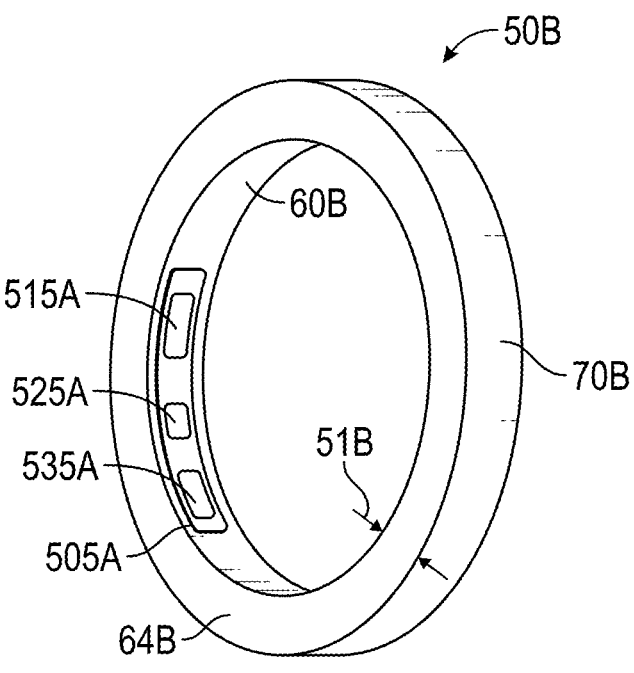
FIG. 7B is a perspective illustration of an example hardware configuration for a flexible electronic device attached to a narrow-band ring and suitable for use with the flexible circuit and control system of FIG. 4.

FIG. 7B is a perspective illustration of an example hardware configuration for a flexible electronic device 505A attached to a narrow-band ring 50B. The ring 50B is sized and shaped for wear on a finger or thumb. The ring 50B has a radial thickness 51B extending between a generally cylindrical inner surface 60B and an opposing outer surface 70B. The ring 50B has a lateral width 52B as shown in FIG. 11B. The flexible electronic device 505B is sized and shaped to flexibly conform to the inner surface 60B without significant overlap. The flexible electronic device 505A may be sized in thickness to inhibit irritation of the finger or thumb while also facilitating awareness of the device for the wearer of the ring 50B. The flexible electronic device 505A includes an integrated circuit 515A, coupled to one or more input sensors 525A, both of which are coupled to a power system 535A.

The one or more input sensors 406A, 525A are located on the inner surfaces 60A, 60B of the rings 50A, 50B, as shown in FIG. 7A and FIG. 7B, respectively. The input sensors 406A, 525A while worn in this configuration are generally inaccessible to direct touch from another finger or thumb and inaccessible to ambient light. The input sensors 406A, 525A in some implementations include one or more touch sensors 627 configured to detect and respond to finger taps, such as when the supporting finger taps a surface or when a user's second finger or thumb taps the supporting finger. The input sensors 406A, 525A in some implementations include one or more buttons 623, either mechanical or capacitance-based, as described herein. A mechanical button 623 located on an inner surface 60A, 60B may be positioned in an orientation likely to respond to a pressing force on the ring 50A, 50B against the supporting finger. A capacitance-based button 623 in some implementations may be configured to respond to a change in capacitance when a user's thumb or second finger touches the ring-supporting finger, or when the user closes the hand in a first with multiple fingers touching the ring-supporting finger.

FIG. 8A is a perspective illustration of an example hardware configuration for a flexible electronic device 402B attached to a ring 50A. The flexible electronic device 402B includes an integrated circuit 404B, coupled to one or more input sensors 406B, both of which are coupled to a power system 408B. The flexible electronic device 402B is sized and shaped to flexibly conform to both a portion of the inner surface 60A and a portion of one of the opposing side edges 64A. The flexible electronic device 402B in some implementations also extends along a portion of the other side edge 66A or both edges 64A, 66A (not shown). One or more input sensors 406B in some implementations is located along the edge 64A of the ring 50A, while other input sensors 406B may be located on the inner surface 60A. The edge 64A of the ring 50A is relatively accessible to direct touch from another finger or thumb and accessible to ambient light, especially considering the ring 50A may be rotated about the supporting finger to place the input sensors 406B at a radial location that is accessible and exposed to ambient light. The input sensors 406B in some implementations include an array of edge-mounted touch sensors 627 configured to detect any of a variety of touches, taps, swipes, slides, or other interactions.

FIG. 8B is a cross-sectional illustration of the example hardware configuration for a flexible electronic device 402B shown in FIG. 8A. The flexible electronic device 402B as shown is attached to a portion of the inner surface 60A and a portion of one of the opposing sides edges 64A. The flexible electronic device 402B in some implementations is configured to withstand a bending of at least about ninety degrees across the curvilinear intersection between the inner surface 60A and the side edge 64A.

FIG. 9A is a perspective illustration of an example hardware configuration for a flexible electronic device 402C attached to a ring 50A. The flexible electronic device 402C includes an integrated circuit 404C, coupled to one or more input sensors 406C, both of which are coupled to a power system 408C. The flexible electronic device 402C is sized and shaped to flexibly conform to (1) a portion of the inner surface 60C, (2) a portion of one of the opposing side edges 64C, 66C (or both of them, not shown), and (3) a portion of the outer surface 70C of the ring 50A. One or more input sensors 406C in some implementations may be located on any of these three surfaces 60C, 64C, 70C. Both the edge 64C and the outer surface 70C are relatively accessible to direct touch from another finger or thumb and accessible to ambient light, especially considering the ring 50A may be rotated about the supporting finger to place the input sensors 406C at a radial location that is accessible and exposed to ambient light. That portion of the flexible electronic device 402C extending across the outer surface 70C in some implementations may be transparent or semi-transparent to minimize its visibility or detraction from the aesthetic features of the ring 50A.

FIG. 9B is a cross-sectional illustration of the example hardware configuration for a flexible electronic device 402C shown in FIG. 9A. The flexible electronic device 402C as shown is attached to (1) a portion of the inner surface 60C, (2) a portion of one of the opposing side edges 64C, and (3) a portion of the outer surface 70C of the ring 50A. The flexible electronic device 402C in some implementations is configured to withstand a bending of at least about ninety degrees across the curvilinear intersections between the inner surface 60C and the side edge 64A, and between the side edge 64C and the outer surface 70C.

FIG. 10 is a perspective illustration of an example hardware configuration for a flexible electronic device 402D attached to a ring 50A. The flexible electronic device 402D is sized and shaped to flexibly conform and attach to the outer surface 70A without significant overlap. The flexible electronic device 402D includes an integrated circuit 404D, coupled to one or more input sensors 406D, both of which are coupled to a power system 408D. The flexible electronic device 402D may be transparent or semi-transparent to minimize its visibility or detraction from the aesthetic features of the ring 50A.

FIG. 11A is a perspective illustration of an example hardware configuration for a flexible electronic device 402E attached to a narrow-band ring 50B. The flexible electronic device 402E includes an integrated circuit 404E, coupled to one or more input sensors 406E, both of which are coupled to a power system 408E. The flexible electronic device 402E in some implementations includes a main portion that is sized and shaped to flexibly conform to the inner surface 60B and an extended portion that is sized and shaped to overhang laterally for a lateral distance 552B beyond one of the side edges 64B (or both edges 64B, 66B, as shown). One or more input sensors 406E in some implementations is located in the extended portion, while other input sensors 406E may be located on the inner surface 60B. The extended portion of the flexible electronic device 402E is relatively accessible to direct touch from another finger or thumb and accessible to ambient light, especially considering the ring 50B may be rotated about the supporting finger to place the input sensors 406E at a radial location that is accessible and exposed to ambient light. The input sensors 406E in some implementations include an array of edge-mounted touch sensors 627 configured to detect any of a variety of touches, taps, swipes, slides, or other interactions. The extended portion of the flexible electronic device 402E in some implementations overhangs one or both side edges 64B, 66B and is not attached by adhesive to any portion of the ring 50B. Accordingly, the extended portion may support one or more input sensors 406E along its upper surface, its relatively narrow outer surface, or its lower surface. Moreover, the flexible electronic device 402E is configured to be flexible near and across the curvilinear intersection between the inner surface 60B and the side edges 64B, 66B, thus providing in this flexible region another place to support one or more input sensors 406E. For example, an input sensor 406E may be located and configured to detect an interaction, such as a forceful bending of the extended portion relative to the main portion.

FIG. 11B is a cross-sectional illustration of the example hardware configuration for a flexible electronic device 402E shown in FIG. 11A. The flexible electronic device 402E as shown is attached to a portion of the inner surface 60B and an extended portion overhangs the sides edges 64B, 66B. The flexible electronic device 402E in some implementations may be configured to withstand bending relative to the curvilinear intersection between the inner surface 60C and the side edges 64B, 66B, including a spring or other biasing element that urges the extended portion back to its original default position.

Figure 12:
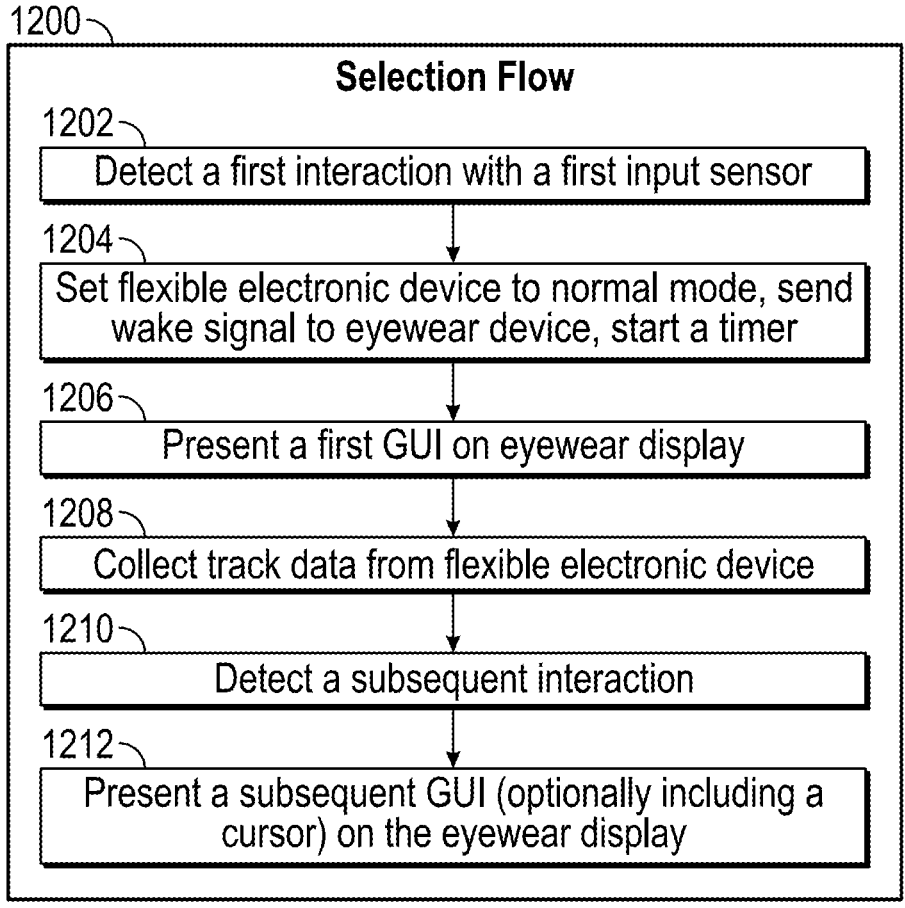
FIG. 12 is an example flow chart for selectively operating a user interface on a wearable device (e.g., an eyewear device) suitable for use with the flexible circuit and control system of FIG. 4.

FIG. 12 is an example flow chart for selectively operating a user interface on a wearable device (e.g., an eyewear device). Although the steps are described with reference to a flexible electronic device 402 and an eyewear device 100, as described herein, other implementations of the steps described, for other types of devices, will be understood by one of skill in the art from the description herein. Additionally, it is contemplated that one or more of the steps shown in FIG. 12 and described herein may be omitted, performed simultaneously or in a series, performed in an order other than illustrated and described, or performed in conjunction with additional steps.

As shown in FIG. 12, the Selection Flow 1200 depicts steps for using the flexible electronic device 402 to interact with a graphical user interface (GUI) on a mobile device, such as an eyewear device 100. The flexible electronic device 402 in some implementations monitors the applications 690 currently running as well as the state of the applications, data, signals, events, timestamp, and related information using the global internal state 680, as described herein.

At step 1202, the flexible electronic device 402 detects a first interaction with at least a first input sensor selected from among one or more input sensors 406. If the first interaction exceeds a first sensitivity threshold, then at step 1204, the flexible electronic device 402 switches to normal mode, sends a wake signal to an eyewear device 100, and starts a timer.

At step 1206, when the wake signal is received, the eyewear device 100 is configured to present a first graphical user interface on a display 180A/180B associated with the eyewear device 100. The first graphical user interface may include the display of a cursor at a first location along a path.

At step 1208, the flexible electronic device 402 in some implementations collects motion data associated with a course traveled by a hand in motion that is holding the flexible electronic device 402. The motion data associated with the course is used to determine the next or subsequent location of the path of the cursor on the display. In this aspect, the path of the cursor on the display is substantially correlated to the course traveled by the flexible electronic device 402 (in the air) in near real-time, such that the cursor moves in close synchronization with the motion of the flexible At step 1210, the eyewear device 100 in some implementations is configured to detect a subsequent interaction associated with the first sensor (or with one or more second input sensors 406 on the flexible electronic device 402). The subsequent sensitivity threshold in normal mode, in some implementations, is generally lower than the first sensitivity threshold because the flexible electronic device 402 is active, by itself or together with an eyewear device 100 or another mobile device, and ready to receive additional inputs. If the subsequent interaction exceeds the subsequent sensitivity threshold, then the eyewear device 100 in some implementations is configured at step 1212 to present a subsequent graphical user interface on a display 180A/180B) associated with the eyewear device 100.

The subsequent graphical user interface, in some implementations, includes the cursor presented on the display. Based on the motion data associated with the course traveled by the flexible electronic device 402, the eyewear device 100 displays the cursor at a second location. The cursor in some implementations may be used to select or otherwise interact with other elements of the subsequent GUI presented on the display.

The display of the eyewear device 100, in some implementations, is projected onto a surface, such as a head-mounted screen or onto at least one lens assembly (e.g., an optical element 180A, 180B of an eyewear device 100) as described herein. The eyewear device 100 may include a projector 150 (FIG. 2B) that is positioned and configured to project the cursor (in motion along its path) onto at least one optical lens assembly (e.g., the right optical element 180B). In this implementation, the flexible electronic device 402 cooperates with the eyewear 100 to present the GUI on the display.

The flexible circuit and control system 400, as shown in FIG. 4, in some implementations, includes a handheld device (e.g., flexible electronic device 402) and a portable device (e.g., eyewear 100). The flexible electronic device 402 includes a microcontroller 612, an input device 406 (e.g., touchpad), and an inertial measurement unit 572. The eyewear 100, which is in communication with the flexible electronic device 402, includes a processor 432, a memory 434, and a display (e.g., the image display associated with at least one lens or optical assembly 180A, 180B).

Any of the functionality described herein for the eyewear device 100, the flexible electronic device 402, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
a handheld device in communication with an electronic eyewear device, wherein the handheld device comprises a local memory, a power system, a first sensor, a flexible panel supporting an integrated circuit, and a body portion defining a surface and a side edge,
wherein the flexible panel comprises a main portion and an extended portion, wherein the main portion is sized and shaped to conform to a part of the surface, wherein the extended portion supports the first sensor, and wherein the extended portion is sized and shaped to extend for a distance beyond the side edge;
programming in the local memory, wherein execution of the programming configures the handheld device to perform functions, including functions to:
draw power from the power system according to a sensing-power budget that is sufficient to power the first sensor;
detect a first interaction relative to the first sensor, wherein the first interaction comprises one or more of a touch, an optical input, and a bending input; and
in response to the first interaction, broadcast a wake signal to the electronic eyewear device.

2. The system of claim 1, wherein the programming configures the handheld device to perform additional functions, including additional functions to:
determine whether the first interaction exceeds a sensitivity threshold associated with the first sensor; and
in response to the first interaction, draw power from the power system according to a full-power budget.

3. The system of claim 1, wherein the programming configures the handheld device to perform additional functions, including additional functions to:
determine whether the first interaction exceeds a sensitivity threshold associated with the first sensor;

start a timer associated with the wake signal, wherein the timer comprises a programmable time-out interval;
detect a command from the electronic eyewear device; and
in response to not detecting the command during the time-out interval, draw power according to the sensing-power budget.

4. The system of claim 1, wherein the extended portion is flexible relative to the main portion, and wherein the programming configures the handheld device to perform additional functions, including additional functions to:
determine whether the bending input exceeds a rotational threshold relative to the main portion; and
in response to the bending input, send the wake signal to the electronic eyewear device.

5. The system of claim 1, wherein the handheld device comprises an inertial measurement unit, and wherein the programming configures the handheld device to perform additional functions, including additional functions to:
determine, using the inertial measurement unit, whether a movement of the handheld device exceeds a threshold acceleration; and
in response to the movement, send the wake signal to the electronic eyewear device.

6. The system of claim 1, wherein the first sensor comprises a plurality of input sensors, wherein the plurality of input sensors comprises one or more of:
a button in communication with a contact controller,
a capacitance sensor coupled to the button,
a touch sensor in communication with a touch controller,
an optical sensor in communication with an optical controller, and
a motion sensor in communication with a motion controller.

7. The system of claim 1, wherein the power system comprises a dual-mode power management system configured to deliver power according to one or more of the sensing-power budget and a full-power budget.

8. The system of claim 1, wherein the power system comprises a recharging assembly, wherein the recharging assembly comprises one or more of:
a charging pin accessibly located on the handheld electronic device and operable to pair with a compatible power supply cord,
a wireless induction-based recharging system, and
an energy harvesting system operable to generate power from kinetic motion or solar energy.

9. The system of claim 1, wherein the body portion comprises a ring that is sized and shaped for wear on a finger or a thumb,
wherein the surface comprises a generally cylindrical inner surface and an opposing outer surface, and
wherein the side edge comprises one or more side edges relative to the inner surface or the outer surface.

10. The system of claim 1, wherein the electronic eyewear device comprises a processor, a memory, and a display, and wherein the system comprises:
programming in the memory, wherein execution of the programming configures the electronic eyewear device to perform functions, including functions to:
receive the wake signal;
present a graphical user interface on the display as an overlay relative to a physical environment;
detect a second interaction from the handheld device; and
execute a selection relative to the graphical user interface based on the second interaction.

11. A method of using a handheld device comprising a local memory, a power system, a flexible panel supporting an integrated circuit, and a body portion, wherein the method comprises:

sizing and shaping a main portion of the flexible panel to conform to the body portion, wherein the body portion defines a side edge;

supporting a first sensor with an extended portion of the flexible panel, wherein the extended portion is sized and shaped to extend for a distance beyond the side edge;

drawing power from the power system according to a sensing-power budget, wherein the sensing-power budget is sufficient to power the first sensor;

detecting a first interaction relative to the first sensor, wherein the first interaction comprises one or more of a touch, an optical input, and a bending input; and in response to the first interaction, broadcasting a wake signal to an electronic eyewear device.

12. The method of claim 11, further comprising:

determining whether the first interaction exceeds a sensitivity threshold associated with the first sensor; and in response to the first interaction, drawing power from the power system according to a full-power budget.

13. The method of claim 11, further comprising:

determining whether the first interaction exceeds a sensitivity threshold associated with the first sensor;

starting a timer associated with the wake signal, wherein the timer comprises a programmable time-out interval;

detecting a command from the electronic eyewear device; and in response to not detecting the command during the time-out interval, drawing power according to the sensing-power budget.

14. The method of claim 11, further comprising:

sizing and shaping the extended portion to be flexible relative to the main portion;

determining whether the bending input exceeds a rotational threshold relative to the main portion; and in response to the bending input, send the wake signal to the electronic eyewear device.

15. The method of claim 11, wherein detecting the first interaction comprises one or more of:

detecting a force relative to a button coupled to the handheld device;

detecting a capacitance change associated with an object with a proximity of the button;

detecting a touch relative to a touch sensor coupled to the handheld device;

detecting a change in luminous intensity relative to an optical sensor coupled to the handheld device; and detecting a movement of the handheld device using a motion sensor coupled to the handheld device and determining whether the movement exceeds a threshold acceleration.

16. The method of claim 11, wherein the electronic eyewear device comprises a processor, a memory, and a display, and wherein the method comprises:

receiving the wake signal;

presenting a graphical user interface on the display as an overlay relative to a physical environment;

detecting a second interaction from the handheld device; and executing a selection relative to the graphical user interface based on the second interaction.

17. A non-transitory processor-readable storage medium that stores processor-executable instructions that, when executed by a local processor coupled to a handheld device, is operative to cause the handheld device to perform operations, including operations to:

draw power from a power system coupled to the handheld device according to a sensing-power budget, wherein the sensing-power budget is sufficient to power a first sensor coupled to the handheld device, wherein the handheld device further comprises a flexible panel supporting an integrated circuit and a body portion defining a side edge, wherein the flexible panel comprises a main portion and an extended portion, wherein the main portion is sized and shaped to conform to a part of the body portion, wherein the extended portion supports the first sensor, and wherein the extended portion is sized and shaped to extend for a distance beyond the side edge;

detect a first interaction relative to the first sensor, wherein the first interaction comprises one or more of a touch, an optical input, and a bending input; and in response to the first interaction, broadcast a wake signal to an electronic eyewear device.

18. The non-transitory processor-readable storage medium of claim 17, wherein the instructions when executed cause the handheld device to perform further operations, including further operations to:

determine whether the first interaction exceeds a sensitivity threshold associated with the first sensor;

in response to the first interaction, draw power from the power system according to a full-power budget;

start a timer associated with the wake signal, wherein the timer comprises a programmable time-out interval;

detect a command from the electronic eyewear device; and in response to not detecting the command during the time-out interval, draw power according to the sensing-power budget.

19. The non-transitory processor-readable storage medium of claim 17, wherein the extended portion is flexible relative to the main portion, and wherein the instructions when executed cause the handheld device to perform further operations, including further operations to:

determine whether the bending input exceeds a rotational threshold relative to the main portion; and in response to the bending input, send the wake signal to the electronic eyewear device.

20. The non-transitory processor-readable storage medium of claim 17, wherein the instructions when executed cause the handheld device to perform further operations, including further operations to:

detect a force relative to a button coupled to the handheld device;

detect a capacitance change associated with an object with a proximity of the button;

detect a touch relative to a touch sensor coupled to the handheld device;

detect a change in luminous intensity relative to an optical sensor coupled to the handheld device; and detect a movement of the handheld device using a motion sensor coupled to the handheld device and determine whether the movement exceeds a threshold acceleration.

\* \* \* \* \*